US007162528B1

(12) United States Patent

Simonoff et al.

(10) Patent No.: US 7,162,528 B1

(45) Date of Patent: Jan. 9, 2007

(54) COLLABORATIVE ENVIRONMENT IMPLEMENTED ON A DISTRIBUTED COMPUTER NETWORK AND SOFTWARE THEREFOR

(75) Inventors: Adam J. Simonoff, Fairfax Station, VA (US); Julian B. Hebert, Jr., Warsaw, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 730 days.

(21) Appl. No.: 10/260,716

(22) Filed: Oct. 1, 2002

Related U.S. Application Data

(63) Continuation-in-part of application No. 09/551,364, filed on Apr. 17, 2000, which is a continuation-in-part of application No. 09/296,746, filed on Apr. 23, 1999, now Pat. No. 6,351,777, and a continuation-in-part of application No. 09/296,757, filed on Apr. 23, 1999, and a continuation-in-part of application No. 09/296, 802, filed on Apr. 23, 1999, now Pat. No. 6,463,460.

(60) Provisional application No. 60/109,453, filed on Nov. 23, 1998.

(51) Int. Cl.
*G06F 15/16* (2006.01)

(52) U.S. Cl. ...................... 709/229; 709/205; 709/206; 709/207; 709/225; 709/238; 709/240; 709/244; 713/166; 713/167; 726/3; 726/27

(58) Field of Classification Search ................ 709/225, 709/229, 240, 338, 244, 238, 204, 206, 207, 709/205; 713/166, 167; 726/3, 27
See application file for complete search history.

(56) References Cited

U.S. PATENT DOCUMENTS

| | | | | |
|---|---|---|---|---|
| 5,799,151 | A * | 8/1998 | Hoffer | 709/204 |
| 5,941,947 | A * | 8/1999 | Brown et al. | 709/225 |
| 5,987,506 | A * | 11/1999 | Carter et al. | 709/213 |
| 6,205,478 | B1 * | 3/2001 | Sugano et al. | 709/223 |
| 6,266,716 | B1 * | 7/2001 | Wilson et al. | 710/33 |
| 6,408,336 | B1 * | 6/2002 | Schneider et al. | 709/229 |
| 6,453,337 | B1 * | 9/2002 | Miller et al. | 709/204 |
| 6,505,300 | B1 * | 1/2003 | Chan et al. | 713/164 |
| 6,622,247 | B1 * | 9/2003 | Isaak | 713/155 |
| 6,747,970 | B1 * | 6/2004 | Lamb et al. | 370/352 |
| 6,760,324 | B1 * | 7/2004 | Scott et al. | 370/352 |
| 6,816,904 | B1 * | 11/2004 | Ludwig et al. | 709/226 |
| 6,950,876 | B1 * | 9/2005 | Bright et al. | 709/230 |
| 6,985,929 | B1 * | 1/2006 | Wilson et al. | 709/217 |
| 2002/0073059 | A1 * | 6/2002 | Foster et al. | 707/1 |
| 2002/0138572 | A1 * | 9/2002 | Delany et al. | 709/204 |
| 2002/0184311 | A1 * | 12/2002 | Traversat et al. | 709/204 |
| 2003/0097588 | A1 * | 5/2003 | Fischman et al. | 713/200 |

* cited by examiner

*Primary Examiner*—Saleh Najjar
*Assistant Examiner*—Michael Y. Won
(74) *Attorney, Agent, or Firm*—Matthew J. Bussan, Esq.; Gerhard W. Thielman, Esq.

(57) ABSTRACT

A Collaborator computer collaborative environment (CCE) instantiated by a computer network includes N Collaborator CCE clients and a Collaborator CCE server. Each of the N Collaborator CCE clients generates message objects each including a nested group identifier and an associated privilege level; the Collaborator CCE server filters the generated message objects and routes only those message objects to an Nth Collaborator CCE client that is a member of the respective group having the group identifier and that has a privilege greater than or equal to the associated privilege level. Corresponding software is also described.

9 Claims, 9 Drawing Sheets

Common Operational Picture

Live H.263 Video

1000

```html
<HTML>
<HEAD>
<title>Collaborator</title>
</HEAD>
<body bgcolor=#ffffff text=#000000 vlink=#ff5555 link=#0000ff>
<table width = 90%><tr><td>
<IMG SRC="dodlogo.gif" alt="Department of Defense" height=150 width=150><br><br>
<IMG SRC="ONR.gif" alt="Office of Naval Research" ><br><br>
<IMG SRC="NSWCLogo.jpg" alt="Naval Surface Warfare Center - Dahlgren, Va" ><br><br>
<p>
<br><br>
<font size="2">
<i>Point of Contact</i><br>
Julian Hebert<br>
Program Manager<br>
Naval Surface Warfare Center<br>
Dahlgren Division Code B32<br>
Dahlgren, VA 22448-5100<br>
PH 540-653-6466<br>
DSN 249-6466<br>
FAX 540-653-4270<br>
<A HREF="mailto:hebertjb@nswc.navy.mil">hebertjb@nswc.navy.mil</A>
<br>
<br><i>Last Updated Feb 7, 2001</i>
</td><td align = center valign = top>
<CENTER><font color=#00AA00><h5>UNCLASSIFIED</h5></font>
</CENTER><br>
<CENTER>
<IMG SRC="Collaborator.jpg" alt="Logo" >
<br>
<br>
<!--CONVERTED_APPLET-->
<!-- CONVERTER VERSION 1.3 -->
<OBJECT classid="clsid:8AD9C840-044E-11D1-B3E9-00805F499D93"
WIDTH = 400 HEIGHT = 400
codebase="http://java.sun.com/products/plugin/1.3/jinstall-13-win32.cab#Version=1,3,0,0">
<PARAM NAME = CODE VALUE = "wb.wb.class" >
<PARAM NAME = ARCHIVE VALUE = "wb.jar,voip.jar,vegas.jar" >
<PARAM NAME = VOIPClient VALUE ="genesis2.nswc.navy.mil">
<PARAM NAME="type" VALUE="application/x-java-applet;version=1.3">
<PARAM NAME="scriptable" VALUE="false">
<PARAM NAME = UploadURL VALUE ="/cgi-bin/upload.pl">
<PARAM NAME = "audioURL" VALUE ="Dreams.mp3">
<PARAM NAME = FileDirectory VALUE ="uploadadmin/">
<PARAM NAME = DocumentDirectory VALUE ="uploadadmin/">
<PARAM NAME = FileDirectoryPath VALUE ="uploadedfiles/">
<PARAM NAME = UserGuideURL VALUE ="userguide.html">
<PARAM NAME = RevHistoryURL VALUE ="revisionhistory.html">
<PARAM NAME="proxy" VALUE="http://127.0.0.1/cgi-bin/proxysvr.pl">
<PARAM NAME = OpenMap VALUE ="d:\progra~1\apache~1\apache\htdocs
\data\applet.properties">
<PARAM NAME = WhiteboardDrawObjects VALUE ="
"SELECT*,
wb.Freehand,
wb.Oval,
wb.Filled_Oval,
wb.Rectangle,
wb.Filled_Rectangle,
wb.Text,
wb.HyperLink,
[wb.Picture],
[MetarsApplet],
[encata.EncataApplet],
[wb.WeatherApplet],
[qv.Applet],
[table.LaunchTimeTable],
[CommonOperationalPicture],
[wb.Video]
">
<COMMENT>
<EMBED type="application/x-java-applet;version=1.3" CODE = "wb.wb.class" ARCHIVE = "wb.jar,voip.jar,vegas.jar" WIDTH = 400 HEIGHT = 400 UploadURL ="/cgi-bin/upload.pl" FileDirectory ="uploadadmin/" DocumentDirectory ="uploadadmin/" audioURL ="Dreams.mp3" FileDirectoryPath ="uploadedfiles/" UserGuideURL ="userguide.html" proxy ="http://127.0.0.1/cgi-bin/proxysvr.pl" RevHistoryURL ="revisionhistory.html" VOIPClient ="genesis2.nswc.navy.mil" OpenMap ="d:\progra~1\apache~1\apache\htdocs\data\applet.properties" WhiteboardDrawObjects = "SELECT*,wb.Freehand,wb.Oval,wb.Filled_Oval,wb.Rectangle,wb.Filled_Rectangle,wb.Text,wb.HyperLink,[wb.Picture],[CommonOperationalPicture],[wb.Video]"
scriptable=false <NOEMBED></COMMENT>

</NOEMBED></EMBED>
</OBJECT>
```

Fig. 4a

```
<!--
<APPLET CODE = "wb.wb.class" ARCHIVE = "wb.jar,voip.jar,vegas.jar"
WIDTH = 400 HEIGHT = 400>
<PARAM NAME = UploadURL VALUE   ="/cgi-bin/upload.pl">
<PARAM NAME = VOIPClient VALUE   ="genesis2.nswc.navy.mil">
<PARAM NAME = FileDirectory VALUE   ="uploadadmin/">
<PARAM NAME = DocumentDirectory VALUE   ="uploadadmin/">
<PARAM NAME = FileDirectoryPath VALUE   ="uploadedfiles/">
<PARAM NAME = UserGuideURL VALUE   ="userguide.html">
<PARAM NAME = RevHistoryURL VALUE   ="revisionhistory.html">
<PARAM NAME="proxy" VALUE="http://127.0.0.1/cgi-bin/proxysvr.pl">
<PARAM NAME = OpenMap VALUE   ="d:\progra~1\apache~1\apache\htdocs
\data\applet.properties">
<PARAM NAME = "audioURL" VALUE ="Dreams.mp3">
<PARAM NAME = WhiteboardDrawObjects VALUE   ="
*SELECT*,
wb.Freehand,
wb.Oval,
wb.Filled_Oval,
wb.Rectangle,
wb.Filled_Rectangle,
wb.Text,
wb.HyperLink,
[wb.Picture],
[MetarsApplet],
[encata.EncataApplet],
[wb.WeatherApplet],
[qv.Applet],
[table.LaunchTimeTable],
[CommonOperationalPicture],
[wb.Video]

">



</APPLET>
-->
<!--"END_CONVERTED_APPLET"-->


<br>

<br><br><br>
<a href = "/dodwarning.html" border = 0><img src = "warnnote.gif"></a><br>
```

```
<br><br><br><br>
<CENTER><font color=#00AA00><h5>UNCLASSIFIED</h5></font>
</CENTER>
</td></tr></table>
</CENTER>
</BODY></HTML>
```

Fig. 4b

```
package wb.server;
 import java.io.*,

 public class MessageObject implements Serializable
 {
   private Object Sender;
   private Object Destination;
   private Object Privilege;
   private Object Group;
   private Object User;
   private Object Data;
   private Object Source;
   private Object TimeStamp;

   MessageObject(Object sender,
            Object destination,
            Object privilege,
            Object group,
            Object user,
            Object data,
            Object Source,
            Object timestamp)
   {
     Sender = sender;
     Destination = destination;
     Privilege = privilege,
     Group = group;
     Data = data,
     TimeStamp = timestamp;
     User = user;
   }
   public Object getSender(){
     return Sender;}
   public Object getDestination(){
     return Destination;}
   public Object getPrivilege(){
     return Privilege;}
   public Object getGroup(){
     return Group;}
   public Object getData(){
     return Data;}
   public Object getUser(){
     return User;}
   public Object getSource(){
     return Source;}
   public Object getTimeStamp(){
     return TimeStamp,}
   public void setTimeStamp(String t){
     TimeStamp = t;}
 }
```

Fig. 5

COLLABORATIVE ENVIRONMENT IMPLEMENTED ON A DISTRIBUTED COMPUTER NETWORK AND SOFTWARE THEREFOR

CROSS-REFERENCE TO RELATED APPLICATIONS

This is a Continuation-in-Part of U.S. Ser. No. 09/551,364, which was filed on Apr. 17, 2000, which is a combined Continuation-in-Part of U.S. Ser. No. 09/296,746, which issued as U.S. Pat. No. 6,351,777 B1 on Feb. 26, 2002, U.S. Ser. No. 09/296,757, and U.S. Ser. No. 09/296,802, now U.S. Pat. No. 6,463,460 all of which were filed on Apr. 23, 1999. Moreover, this patent application claims the benefit of priority, under 35 U.S.C. §119(e), to Provisional Patent Application No. 60/109,453, which was filed on Nov. 23, 1998, and which is incorporated, in its entirety, herein by reference.

STATEMENT OF GOVERNMENT INTEREST

The invention described herein was made in the performance of official duties by employees of the Department of the Navy and, thus, the invention disclosed herein may be manufactured, used, licensed by or for the Government for governmental purposes without the payment of any royalties thereon.

BACKGROUND OF THE INVENTION

The present invention relates to the field of distributed computer systems. More specifically, the present invention relates to a collaborative environment instantiated by a distributed computer system that facilitates interchange of information between two or more users sitting at respective computer terminals disposed in the collaborative environment.

Organizations, e.g., military organizations, since the dawn of time have recognized the value of command, control, communications, and intelligence functions in achieving a defined goal. With the invention of the computer, a computer, i.e., a data processing function, was added to the tools necessary for organizations striving to achieve the stated goal. In recent times, the need for various individuals and groups within the organization to effectively collaborate with one another was also recognized. Stated another way, real or near real time communications made it possible for members within an organization to collaborate with one another. Thus, Command, Control, Communications, Computers, Collaboration and Intelligence (C5I) became a necessary organizational requirement.

As discussed in U.S. Pat. No. 6,351,777 to Simonoff, several services within the U.S. Military often need to interoperate, i.e., interact and communicate, with one another in order to plan and to subsequently carry out Joint Missions. More specifically, the participants in a Joint Mission must be able to share information including text data, images, and, more importantly, various computer generated displays of consolidated tactical information. Moreover, even when interoperability concerns are satisfied, this only assures that information can be transferred from the source of the information to the user of the information; there still exists the concern that the various users will be unable to coordinate their efforts, i.e., collaborate with one another, in planning and executing the mission and in critiquing completed missions. For example, while collaboration between various intelligence agencies and military branch during mission planning is essential, it often does not occur due the logistics involved in assembling the requisite personnel in one location. Thus, planning often involves an exchange of documents as one group develops a mission plan and the other groups or individuals critique the plan. Such planning is conducted using messages in the military realm (Email in a corporate environment).

It will be appreciated that the various components of the U.S. Military use a heterogeneous collection of computers running a wide variety of operating systems, e.g., MS-DOS, Windows 3.1, Windows-95, Windows-NT, O/S-2, Macintosh O/S, and several versions of UNIX. The number of different systems that must be interconnected varies with each Joint Mission, making it extremely difficult for the components of the U.S. Military to interoperate. In particular, it is extremely difficult for the various military components to share a homogeneous view of tactical information. The degree of difficulty is often increased when the various military components are physically separated from one another over long distances. Although communication channels are available to interconnect the various computers, wide geographic separation generally dictates the use of a narrow band communications link.

Military components can share text data, maps and/or photographs used in conveying tactical data, after a fashion, even when using dissimilar computers. For example, map data may be displayed using a particular computer program, assuming that a version of the particular computer program tailored to run on each variation of the individual computers forming a computer system is available. It should be mentioned, however, that each branch of the service often uses branch-specific symbols for displaying information; the Army may designate ground troops using one symbol while the naval vessels providing fire support may use a completely different symbol to represent the identical ground troops. The problem is exacerbated when armies from several nations, e.g., a NATO force, are endeavoring to interoperate.

It will be appreciated that the foregoing discussion assumes that several versions of the same program can be installed on the various computers being networked to one another; the problem is exacerbated when the computer systems, which must be networked, are running incompatible operating systems. For example, the Joint Mission parameters often dictate that a UNIX computer acting as a server, i.e., the computer providing data, be interconnected to various desktop computer and workstation clients, i.e., the computers receiving the data, which clients are running several other incompatible operating systems.

The advent of the Internet, and particularly the World Wide Web (the Web), permits a server to provide clients with JAVA™ applications (Applets) embedded into the HTML document. A JAVA™ Applet is a small program that can be run automatically as soon as the associated HTML document is transferred from the server to the client(s); several JAVA™ Applets may be transferred to a client within a single HTML document. The principal advantage to this approach lies in program configuration control, i.e., just the server side program is updated; the client automatically receives the latest version, for example, of the JAVA™ Applet when the associated HTML document is transferred to the client(s).

As discussed briefly above, the ability for remotely located users to collaborate with one another is significantly different from the ability to collaborate with several co-located individuals. Some discussion of the differences between these two disparate forms of collaboration would probably be helpful at this point.

As discussed in U.S. Pat. No. 5,206,934, when a user performs an operation in a stand alone application with an input device such as a mouse or keyboard, an event is generated by the operating system and passed to the application program for execution. The stand-alone application interprets the events and performs operations to change its internal data in response to the users' request. Such events include, for example, performing a deletion step in a word processing program or creating a graphic element in a computer-aided design (CAD) program.

When the application is expanded from a single user into a multiple user environment, such as simulating a conference over a network or a modem, each user must be able to manipulate the same data and see all of the modifications made to the data. To do this, each machine must interpret and transmit information about what the user is doing and what the user is seeing. There are three basic approaches to accomplish these results. These approaches correspond to three levels of data manipulation referred to as user input, data modification and visual display. Each approach intercepts and transmits information at the particular level. As a result, each approach has specific drawbacks and benefits.

At the highest level, i.e., the user input level, each machine intercepts its user input and transmits that input to other machines. For example, if the user clicked the mouse at a screen location (100, 150), the machine would transmit a "mouse click" command with those coordinates to other machines in the conference. The drawback of this approach is that it requires that all machines be set up in exactly the same manner including identical hardware operating systems and applications. If one user has an icon or symbol in a different place on his screen than other users, then a mouse click on that icon on one machine will not be a mouse click on the icon on the other machines. As a result, communication between the people using the system quickly breaks down because they are each seeing different things on their respective screens, thereby making this method of conferencing unusable.

At the lowest level, namely visual display, each machine intercepts visual outputs to the screen and sends it to all other users so that they see the same screen. A program, which performs such a function, is sometimes referred to as a remote control program. Under such schemes, one machine acts as a host and contains all of the data that is manipulated. The other machines pass user inputs to the host machine and receive screen change commands back. A drawback of this method of conferencing is that it requires a large amount of information to be transmitted in the form of all or part of the screen memory and as a result it is relatively slow and inflexible. Also, because all the users in the conference share the same information, all users must possess sufficient hardware and software to display the screen information including complex graphical representations.

Both of the aforementioned methods manipulate data through one entry point. In other words, even though multiple users are working on a document, each user is seen as a single entity to the system. As a result, if one user selects text in a word processor and another user types the key, both operations will be considered as originating from one user, and the data may be accidentally destroyed. Thus, the user input and visual display systems are not truly collaborative wherein multiple users may modify the data concurrently.

In mid-level conferencing, application primitives (units of information necessary to duplicate the user's operation on remote machines) are sent from one machine to the other, which has the following drawbacks:

1. some centralized control is necessary to implement the exchange of primitives;
2. high performance (speed) computers and expensive computer systems are necessary to implement such mid-level conferencing in real time; and
3. with a centralized architecture, performance limitations are incurred because at least two message transmission delays result between the originating workstation and the controller and then back. While the time delay may be reduced by inter-work station communications, a controller workstation is required and conflicting commands must be reversed or re-executed.

In summary, U.S. Pat. No. 5,206,934 concludes that all of these approaches have serious drawbacks. Some of the approaches rely on host, terminal or master slave relationships among the various users. Some systems only work with the same operating system. Some attempts merely allow one user at a time to access the data. In the case of remote systems, a master controller requires interpretation of screen change commands, which can be slow when the high data volume is relatively high. In primitive passing systems, the problem is alleviated but at the cost of central processing with high performance equipment.

U.S. Pat. No. 5,206,934 proposes an alternative method and apparatus for conferencing among a plurality of computers wherein a local user receives inputs containing user actions and data for interpretation as to what the user action is with respect to the data and produces user action outputs. An interpreter/encoder interprets and encodes the user action outputs into packets of encoded commands and data related thereto. Then, a communications device sends the encoded information to at least one remote user and the local user itself. An interpreter decoder at each computer interprets and decodes the encoded information specifying an operation to be performed on the data. The operation is then executed at the local user and the remote users. In other words, each user on the system works on his/her own version of the document being worked on. Moreover, the system is operating system independent and multiple documents and applications may be worked on at the same time by different sets of users.

In contrast, U.S. Pat. No. 5,515,491, discloses a method and corresponding system which permits management of communications within a collaborative computer-based system including multiple display devices. A shared data object, e.g., a text object, portions of which, e.g., paragraphs, may be displayed on the display devices, is simultaneously accessible by multiple users within the system. Cursors are provided within the shared data object, e.g., the text object, and each cursor is associated with a respective one of the users. In managing communications within the collaborative computer-based system, a region within the shared data object may be designated, a paragraph may be selected by one of the users. A designated message is then automatically transmitted to all users in response to selected activities of one or more users within the designated region of another user for the shared data object.

Other computer system approaches with respect to collaboration between far-flung personnel via the Internet or a dedicated Intranet have been made. One such approach is disclosed in U.S. Pat. No. 6,091,412, which describes a guided telecommunications system, i.e., a system for managing interactions between users (i.e., a guide and one or more clients) in a browser-based telecommunications network. Moreover, several programs for collaboration between widely separated personnel are currently available.

For example, POW WOW, NetMeeting (available from Microsoft, Inc.), Sametime, and InfoWorkspace are personal computer (PC) based programs for collaboration. NetMeeting, for example, permits users to first find other users in cyberspace and then share files, chat, videoconference, sketch, etc. However, neither NetMeeting nor any of the other approaches discussed above, permits active content, links, and GUI objects, nor do these programs and collaboration methods allow for central data storage, logging, and filtering.

It should be mentioned at this point that each of the patents discussed above is incorporated, in its entirety, by reference.

What is needed is computer assisted collaboration technology (CACT). Stated another way, what is needed is a collaboration environment implemented on a computer network or system wherein various users can use the same computer program and share information beyond the visualization of a map, text or photograph regardless of variations in the individual components of the system. Moreover, what is needed is a practical computer system that enables users to quickly and easily interchange graphical user interface (GUI) objects with one another in real time. In short, what is needed is a computer system and corresponding method of operation wherein a computer system achieves component interoperability, collaboration, and cost savings irrespective of computer variation and architecture of the individual computers making up the computer system.

SUMMARY OF THE INVENTION

Based on the above and foregoing, it can be appreciated that there presently exists a need in the art for a collaborative environment instantiated by a computer system, e.g., a distributed computer system, which overcomes the above-described deficiencies. The present invention was motivated by a desire to overcome these and other drawbacks and shortcomings of the presently available technology, and thereby fulfill this need in the art.

In one aspect, the present invention provides a Collaborator computer collaborative environment (CCE) instantiated by a computer network including N Collaborator CCE clients and a Collaborator CCE server, wherein each of the N Collaborator CCE clients generate message objects each including a nested group identifier and an associated privilege level, the Collaborator CCE server filters the is generated message objects and routes only those message objects to an Nth Collaborator CCE client that is a member of the respective group having the group identifier and that has a privilege grater than or equal to the associated privilege level. If desired, the computer network further includes an object generator server different than the Collaborator CCE server, and the Collaborator CCE client receives an object from the object generator server via an Applet. Alternatively, the computer network further includes an object generator server different that the Collaborator CCE server, and a proxy server instantiated by the server instantiating the Collaborator CCE server, and the Collaborator CCE client receives an object from the object generator server via the proxy server. In an exemplary case, the message object corresponds to either a voice packet or a common operational picture (COP) object.

In another aspect, the present invention provides a Collaborator computer collaborative environment (CCE) instantiated by a distributed computer system that facilitates interchange of information between two or more users sitting at respective computer terminals disposed in the collaborative environment, including first and second Collaborator CCE clients, a Collaborator CCE server, and a communications channel operatively coupling the first and second Collaborator CCE clients to the Collaborator CCE server. Advantageously, the first Collaborator CCE client instantiates an applet generating a message object having an embedded group identifier and an associated privilege level, the Collaborator CCE server receives and stores the message object, and the Collaborator CCE server outputs the message object to the second Collaborator CCE when the second Collaborator CCE client is a member of the group associated with the group identifier and the privilege level of the second Collaborator CCE client exceeds the privilege level of the message object. If desired, the computer system further includes an object generator server instantiated by an object server computer different than the computer instantiating the Collaborator CCE server, the object generator server generating a first object, and the first Collaborator CCE client instantiates a first applet, which receives the first object from the object generator server via the communications is channel. Alternatively, the computer system further includes an object generator server instantiated by an object server computer different than the computer instantiating the Collaborator CCE server, the object generator server generating a first object, the computer instantiating the Collaborator CCE server instantiates a proxy server responsive to commands from the first Collaborator CCE and receives the first object via the communications channel, and the first Collaborator CCE client receives the first object from the proxy server via the communications channel. In an exemplary case, the first Collaborator CCE client instantiates first and second applets communicating with one another.

According to a still further aspect, the present invention provides software, i.e., machine readable code stored in a memory for converting a general purpose computer system including at least first, second, and third computers operatively coupled to one another by a communications channel to instantiate a Collaborator computer collaboration environment (CCE) facilitating collaboration between users co-located with the second and third computers. Preferably, the machine readable code instantiates a Collaborator CCE server on the first computer, the Collaborator CCE server providing a web page invoking selected portions of the machine readable code, and first and second Collaborator CCE clients on the second and third computers, respectively, in response to receiving the web page from the Collaborator CCE server, wherein each of the first and second Collaborator CCE generates first and second message objects containing a group identifier and a privilege level, respectively, and the Collaborator CCE receives the first and second message objects, stores the first and second message objects, and transmits the first and second message objects to the second and first Collaborator CCE clients, respectively, when the receiving one of the first and second Collaborator CCE clients is a member of a group corresponding to the group identifier and when the privilege level of the receiving one of the Collaborator CCE clients equals or exceeds the privilege level of the respective one of the first and second message objects.

If desired, the communications channel conforms to Internet protocols, and the first and second message objects correspond to first and second audio packets to thereby permit the first and second users to communicate with one another using a voice over Internet Protocol (VoIP) function. In an exemplary case, the Collaborator CCE server accumulates the first and second message objects to thereby permit the accumulated first and second message object to be replayed under user control. Advantageously, at least one of the first and second Collaborator CCE clients can instantiate first and second Applets capable of communicating with one another.

In a further aspect, the computer system includes a fourth computer instantiating an object server generating a servable object, and one of the first and second Collaborator CCE clients instantiates an object applet, using the machine readable code, for receiving the servable object via the communications channel. Alternatively, the computer system further comprises a fourth computer instantiating an object server generating a servable object, the Collaborator CCE server instantiates a proxy server, using the machine readable code, receiving the servable object from the object server via the communications channel, and one of the first and second Collaborator CCE clients instantiates an object applet, using the machine readable code, for receiving the servable object from the proxy server via the communications channel.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIGS. 4*a* and 4*b* collectively depict the hypertext markup language (HTML) version of a web page including the Collaborator CCE Applet tag invoking the Collaborator CCE according to the present invention; and FIG. 5 depicts the general structure of a message object employed in the present invention.

DETAILED DESCRIPTION OF THE PREFERRED EMBODIMENTS

One of the principal objects of the present inventions, although certainly not the only one, is to provide a Universal Distributed Display Capability (UDDC) for operating substantially all military applications on any commercial off the shelf (COTS) based system supporting a JAVA™ enabled browser. A preferred embodiment of the present invention accomplishes this objective through a software application written in JAVA™ implementing a Common Collaboration Environment (CCE). Beneficially, the combination of the CCE software and a JAVA™ enabled browser at each user location permit collaboration between users of a multilayer Collaborator CCE.

In an exemplary case, the CCE software advantageously can be a JAVA™ applet. The CCE application according to the present invention (hereinafter Collaborator CCE) allows a large organization, e.g., a far-flung Government or commercial enterprise, to solve certain interoperability problems while satisfying collaboration requirements and, thus, satisfy all of the following goals:

a) Collaboratively display tactical and strategic information on any vendor's modern commercial off the shelf (COTS) equipment without modification;

b) Permit display of active moving content, as well as incorporation of active hyperlinks, active GUIs, live video, Voice over Internet Protocol (VoIP), 3-dimensional (3D) objects, etc. in a collaborative manner;

c) Permit expansion of Collaborator CCE capabilities to incorporate third party applications, e.g., language translation software;

d) Requires that all users log into a White Board secure server, allowing each client to be uniquely identified and allowing a system administrator to "kill" Collaborator CCE clients, i.e., forcing the Collaborator CCE client offline; and e) Deliver a technology for providing training both afloat and ashore, independent of the system on which training is being provided and independent of the training facilities available.

Figure 1:
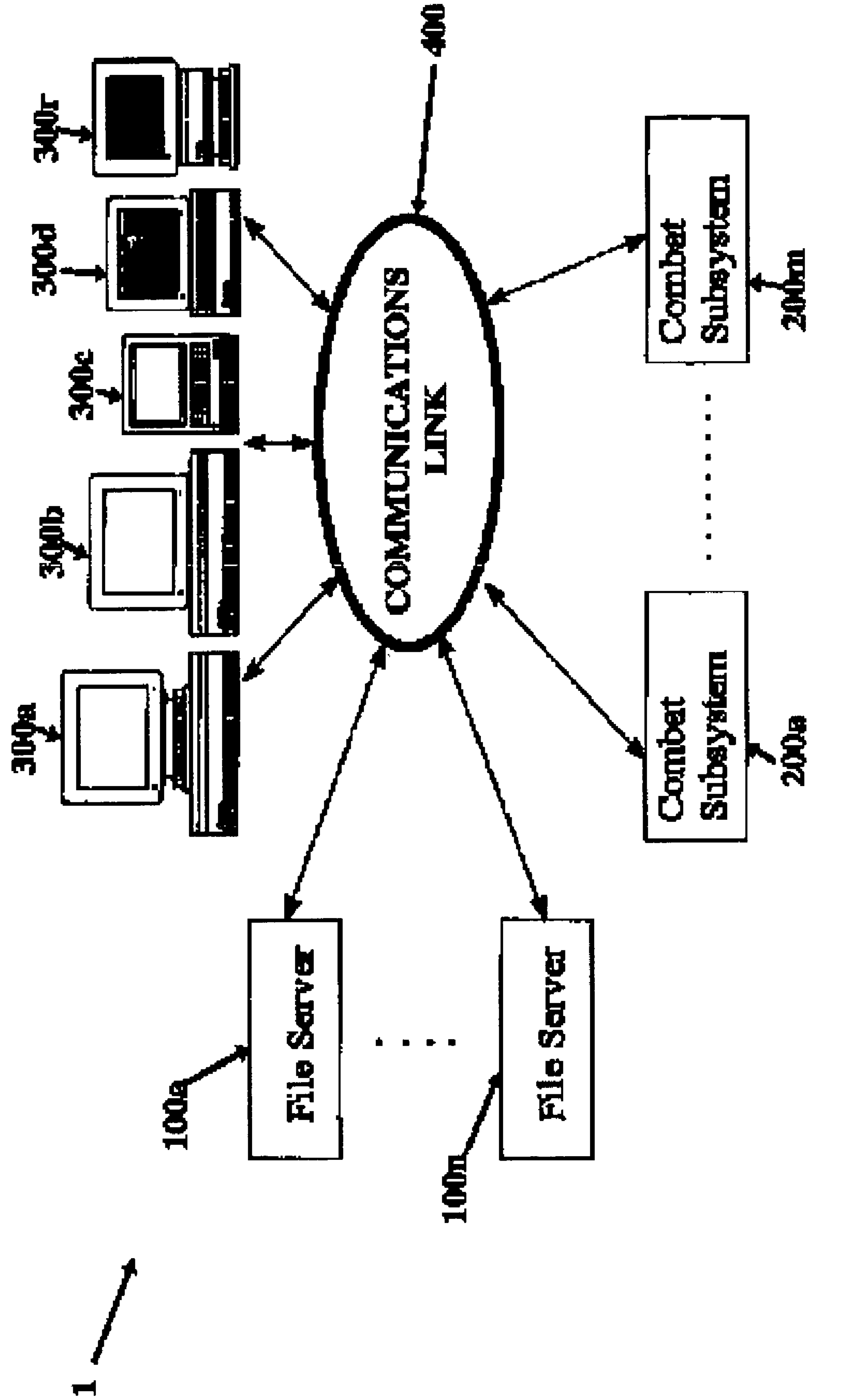
FIG. 1 is a high-level block diagram of a computer system according to the present invention.

A preferred embodiment of the present invention will now be described while referring to FIG. 1, which illustrates a computer system 1 in high-level block diagram form. Preferably, computer system 1 includes servers 100*a* through 100*n*, object generators 200*a* through 200*m*, and computers 300*a*–300*r*. All of the servers 100*a*–100*n*, the object generators 200*a*–200*m* and the computers 300*a*–300*r* advantageously are operatively connected to one another via a communications link 400. In an exemplary case, the object generators 200*a* through 200*m* can be combat subsystems, although the subsystems could just as well be computer systems generating weather maps or stock tickers.

In an exemplary case, servers 100*a*–110*n* are UNIX servers while the object generators 200*a*–200*m* advantageously can be systems such as radar systems, status boards, satellite ground stations, video cameras, etc. Preferably, each of the machines 100*a*–100*n* and 200*a*–200*m* include a processor, working memory, a storage device such as a hard disk and a communications device, e.g., a network interface card. It should also be mentioned that computers 300*a*–300*r* can include desktop computers, laptop computers and/or workstations in any mix. Advantageously, these computers can include a central processing unit, a graphic display processor, the graphic display device, e.g., monitor, a communications device and several memories including both solid state memories, i.e., random access memory (RAM) and a hard disk drive. Preferably, link 400 is a local area network (LAN), although the link 400 advantageously can be a wide area network (WAN) or other interconnection facility such as a frame-based satellite network or even the Internet. Thus, although a JAVA™ enabled web browser is a preferred platform for initiating the Collaborator CCE according to the present invention, connection to the Internet or World Wide Web is NOT required. The computer system 1 advantageously can be a detached local area network or Intranet for practical and security considerations.

It will be appreciated that the present invention was developed in response to perceived problems in the interoperability of legacy computer hardware used in combat systems and networks and solved those problems. However, since the ramifications and applications of the present invention go far beyond the interoperability of combat system hardware, the discussion which follows will use appreciably broader terminology in describing the system and corresponding operating methods according to the present invention.

Figure 2:
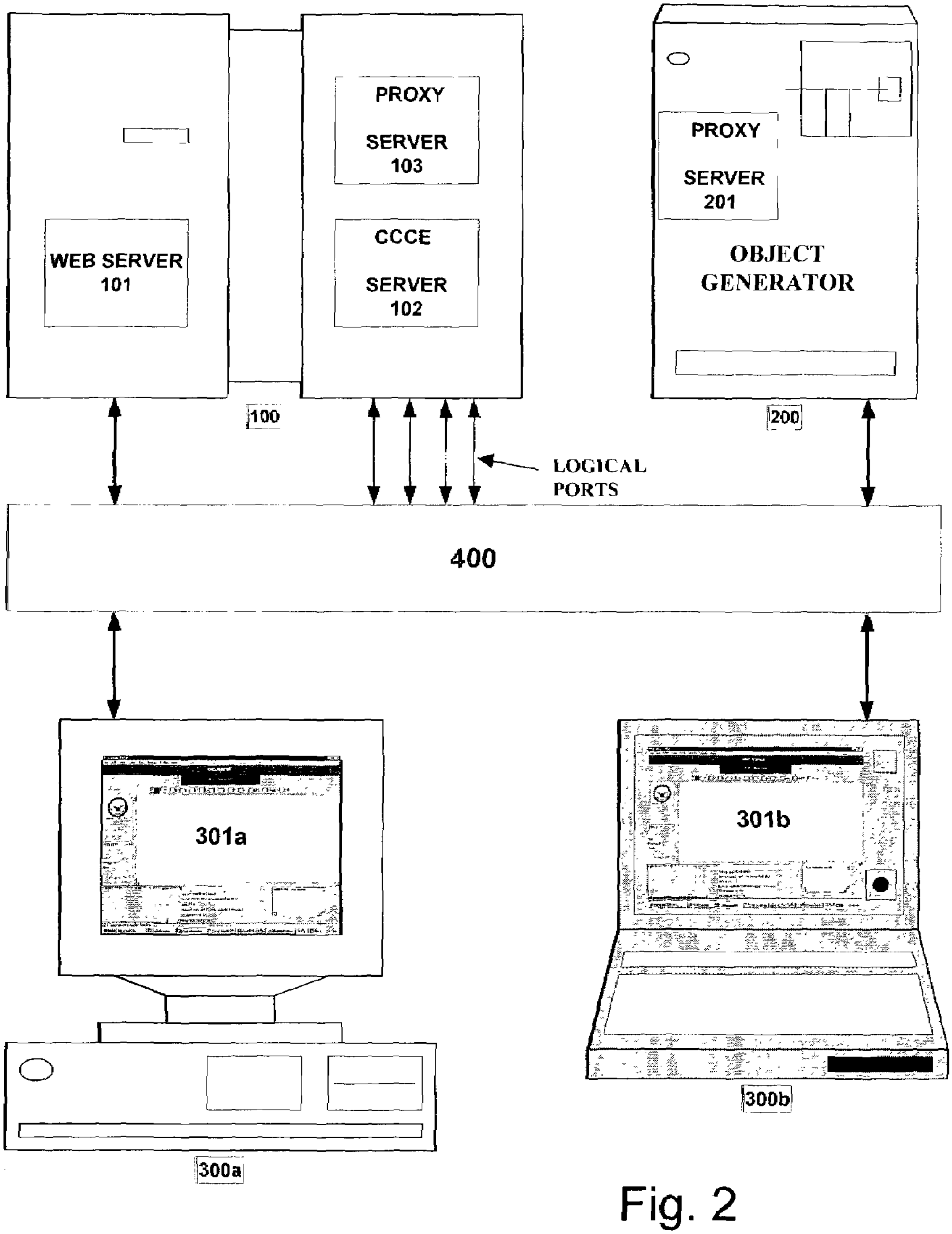
FIG. 2 is a high-level block diagram of selected components of the computer system according to the present invention illustrated in FIG. 1, which illustrates the operation of one of the several alternative operation techniques permitted by the present invention.

Referring specifically to FIG. 2, a computer system 1 according to the present invention includes a server host 100, an application host, i.e., object generator, 200, and, client host computers 300*a* and 300*b*, all of which are interconnected to one another via a LAN or WAN 400 (hereinafter LAN 400). It will be appreciated that LAN 400 advantageously can be any communication channel capable of interconnecting the various distributed components of the computer system 1. Preferably, the server host 100 provides a Web server 101, a White Board server 102, and a generated object proxy server 103, as discussed in greater detail below. The application host 200 advantageously can be another computer running a predetermined program to generate an object, which can be accessed by the users operating client hosts 300*a* and 300*b* via one of several techniques discussed in greater detail below. Alternatively, the application host 200 advantageously can be a file server storing files such as maps and satellite images. Client hosts 300*a* and 300*b* beneficially provide a JAVA™ enabled web browser, i.e., a web browser implementing a JAVA™ virtual machine, while the Web server 101 on server 100 stores a web page and associated White Board Applet tag. See FIGS. 4*a* and 4*b* for an exemplary web page listing. When the downloading of the web page from the Web server 101 to the client host 300*a*, i.e., the web browser on the user's computer, is completed, the Collaborator CCE Applet is executed to thereby display the Collaborator CCE client 301 according to one aspect of the present invention on the user's computer.

More specifically, when the Collaborator CCE Applet 301*a* on client host 300*a* runs, it will connect to the Collaborator CCE Application Server 102 running on server 100 while displaying all of the windows for the client-side Collaborator CCE display, i.e., the Collaborator CCE GUI will be presented to the user. The user can then run the Collaborator CCE application, which can transfer data between the Collaborator CCE server 102 running on server 100 and other Collaborator CCE clients, e.g., computer 300*b*. As discussed in greater detail below, the object generator 200 advantageously can provide information, i.e., an image, which may be an active image, for display on the Collaborator CCE presented on computers 300*a* and 300*b* either directly or via generated object proxy server 103.

As discussed above, there are three mechanisms by which the objects generated by the object server advantageously can be provided to the Collaborator CCE clients 301*a* and 301*b*. The first mechanism requires the use of a generated object server, which mechanism is described in detail in U.S. Pat. No. 6,351,777, instantiated by the Whiteboard server. Objects generated by the object generator were passed via the LAN/WAN to the object server, which passed the object to the Whiteboard clients via the Whiteboard server. See the discussion of FIG. 2 in the '777 patent.

Two alternative mechanisms according to the present invention for enabling objects generated by the object server 200 exist. The first is the employment of Applets instantiated on at least one of the Collaborator CCE clients 301*a* and 301*b* to receive the objects from the object generator 200 via the WAN 400. It should be mentioned that CORBA-enabled Applets advantageously can be employed for this purpose.

CORBA (Common Object Request Broker Architecture), which is a standard from the Object Management Group (OMG) for communicating between distributed objects (objects are self-contained software modules), provides a way to execute programs (objects) written in different programming languages running on different platforms no matter where they reside in the network. CORBA objects are defined by an Interface Definition Language (IDL) that describes the processing (methods) the object performs and the format of the data sent and returned. There is an IDL compiler for each programming language such as C, C++, Java, Smalltalk and COBOL, which lets programmers use familiar constructs, and both client and server applications talk to each other in their respective programming languages. IDL definitions are stored in the Interface Repository, which can be queried by a client application to determine what objects are available on the bus.

At runtime, a CORBA client makes requests to remote CORBA objects via an Object Request Broker (ORB). The ORB provides a proxy object in the client's address space, which creates the illusion that the remote object is a local one. The client and server communicate by exchanging messages defined by the General Inter-ORB Protocol (GIOP). When a client calls a CORBA operation, the client ORB sends a GIOP message to the server. The server ORB converts the request into a call on the server object and then returns the results in a GIOP reply. Finally, the client ORB converts the reply into a normal object reply (method return) for the client application. While GIOP is independent of any specific network transport, when GIOP is sent over TCP/IP, it is called IIOP (Internet Inter-ORB Protocol.)

It should also be mentioned at this point that employing CORBA-enabled Applets permits the Applets instantiated on any Collaborator CCE client 301 to cooperate with one another. For example, the common operational picture (COP) Applet 1018 and the HSQL database (DB) Applet 1026 illustrate in FIG. 3*d* advantageously can be linked to one another so that labels employed in the COP Applet 1018 can be employed as entry points to the DB Applet 1026.

A third mechanism for displaying object produced by the object generator 200 on the Collaborator CCE clients 301*a* and 301*b* is via proxy servers 103 and 201 linking the server 100 and the object generator 200, respectively. It will be appreciated that the proxy server 103 can be instantiated by a Common Gateway Interface (CGI) script, which is a compact program written in a language such as Perl, Tcl, C or C++ that functions as the glue between HTML pages and other programs on the Web server. For example, a CGI script would allow search parameters entered on a Web page to be sent to the DBMS (database management system) for lookup. It would also format the results of that search as an HTML page and send it back to the user. It will be appreciated that the CGI script normally resides in the server and obtains the data from the user via environment variables that the Web server makes available to it.

Referring now to FIGS. 3*a*–3*d*, an exemplary embodiment of the Collaborator CCE client 301*a* according to one aspect of the present invention will now be described. It will be appreciated that all of the FIGS. 3*a*–3*d* advantageously depict a Collaborator CCE Gui 1000 that includes a Tool bar 1002 providing dropdown lists under the headings File, Edit, View, System, Language, and Help. The majority of these dropdown lists or menus are described in, for example, U.S. Pat. No. 6,351,777, and will not be described further. It will be noted that a new Language dropdown menu permits each user to select the language that will be employed in displaying and labeling the various parts of the Collaborator CCE client GUI. In other words, the Collaborator CCE client GUI will be annotated in the user's native language, e.g., English, French, Spanish, German, Russian, etc.

A Whiteboard or drawing area 1004 provides space for the instantiation of objects. Many of these objects, e.g., freehand drawing objects (FIG. 3*b*), text boxes (FIG. 3*b*), images (FIGS. 3*a*–3*d*), etc., and the methods by which these objects are manipulated are also described in U.S. Pat. No. 6,351,777 and, thus, further description will not be provided here.

However, several of the objects are newly implement features which were not implement in the Whiteboard disclosed in the '777 patent; these objects will be described in greater detail below. It should be noted that the underlying drawing area advantageously may be larger that the Whiteboard area 1004, as signified by the scroll bars 1006 and 1008 to the right and bottom of the area 1004.

Surrounding the Whiteboard area 1004 are disposed Group Selector Tabs (hereinafter simply tabs) 1010 and layer selection check boxes 1012, the function of the latter being described in detail in U.S. Pat. No. 6,351,777. Advantageously, the tabs 1010 advantageously permit each user to be logged into several different groups simultaneously. It will be appreciated that the Group function allows users to be assigned and connect to, view and add content in up to 10 different group rooms. It will also be appreciated that information posted to one group room will not be seen in another group, thereby compartmentalizing information flow. It should be mentioned that tabs 1010 allow each user to easily access all groups that the user is assigned to, i.e., the Whiteboard 1004, Chat 1020 and Userlist 1030 areas of the Collaborator CCE client 301*a* are populated with objects identified as belonging to a specific group and, as such, can be viewed only by other users in that specific group. Finally, it will be appreciated that the System Administrator may add new groups consisting of other groups and users. A detailed discussion regarding group and layer assignments is provided with respect to FIG. 5.

As mentioned above, the Collaborator CCE client 301 advantageously provides a chat area 1020 and a userlist display area 1030, which are associated with a respective one of the groups defined by the tabs 1010. The userlist and chat room functions are described in detail in U.S. Pat. No. 6,351,777 and, thus, will not be further described herein.

As discussed above, the Collaborator CCE client 301 advantageously can be employed as a "shell" for Third Party Applets, allowing for quick customization of Collaborator's environment to specific user needs. It will be appreciated that this permits users to collaboratively operate Applets that they are already accustomed to using, thereby reducing training time. Moreover, the ability to employ Third Party Applets lessen the development time and associated cost with implementing a needed function, thereby getting the product to the user both faster and cheaper. Moreover, as previously mentioned, the Collaborator CCE client permits Applets to "talk to" each other while in the Collaborator environment and, thus, pool resources for true database mining.

Still referring to FIGS. 3*a*–3*d*, it will be noted that a live video object 1014 advantageously can be added to the Whiteboard 1004, thus permitting the Collaborator CCE client to display either live or canned video. It will be appreciated that the live video object 1014 is instantiated by a Video Applet, which in an exemplary embodiment is written in JAVA™, and which implements the relatively low bandwidth ITU H.263 video standard, i.e., a compression scheme specifically adapted to teleconferencing via modems rather than higher bandwidth connections.

It should be mentioned at this point that the Collaborator CCE client 301 advantageously includes both a Live Video Applet 1014 and a VoIP Applet 1016 with audio capabilities. While the H.263 standard does not address audio compression, it will be appreciated that the audio is compressed and multiplexed with the compressed video stream in accordance with other ITU standards. In contrast, the VoIP Applet 1016 advantageously compresses the audio stream in accordance with the Global System for Mobile Communications (GSM) standard, a standard regarding digital cellular phone technology based on TDMA that is the predominant system in Europe, but is also used around the world. Thus, the Collaborator CCE employs distinct compression standards on distinct types of data content.

Figure 3A:
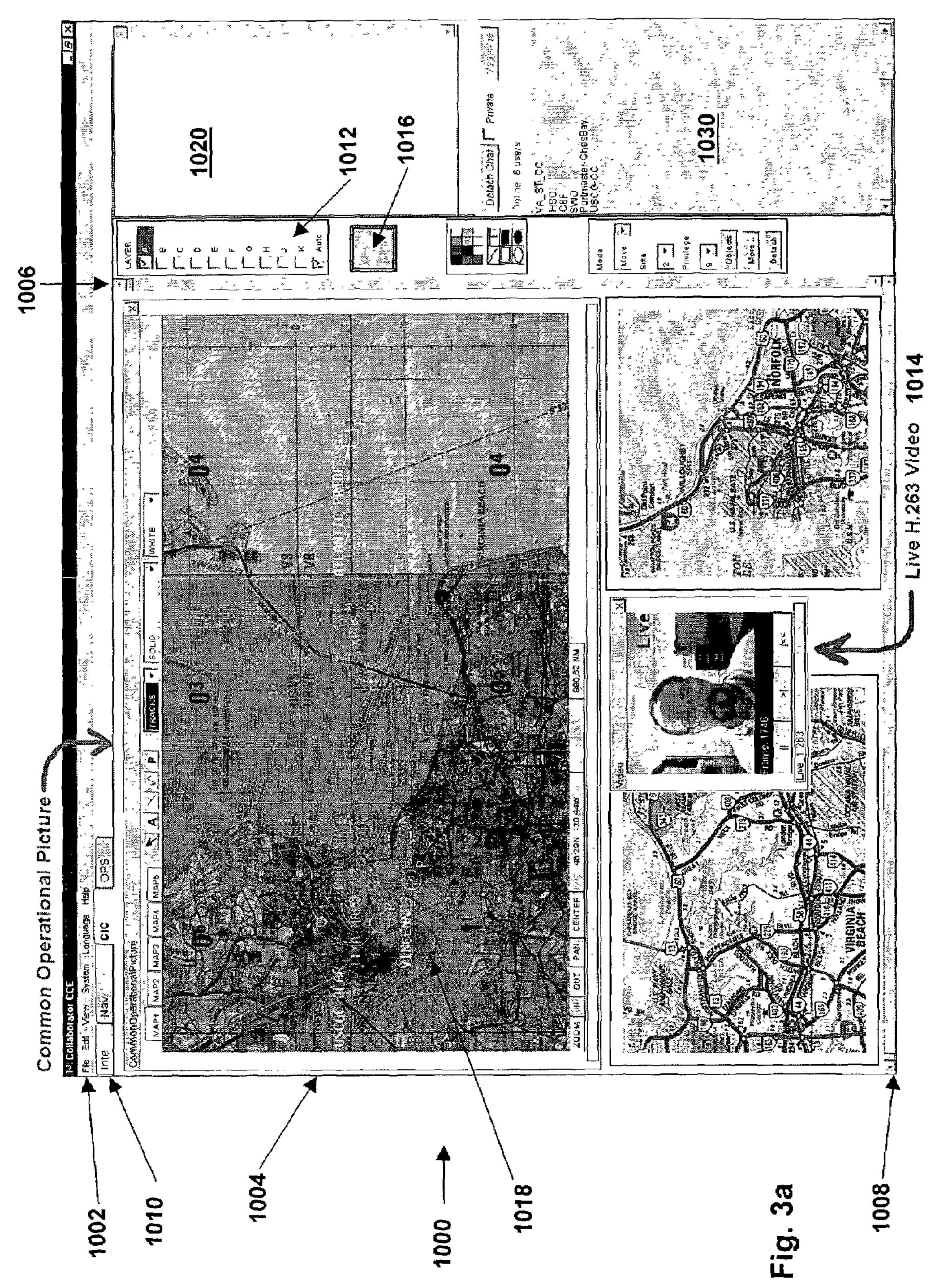
FIGS. 3*a*, 3*b*, 3*c*, and 3*d* are exemplary screen captures of the Collaborator CCE according to the present invention.
Figure 3B:
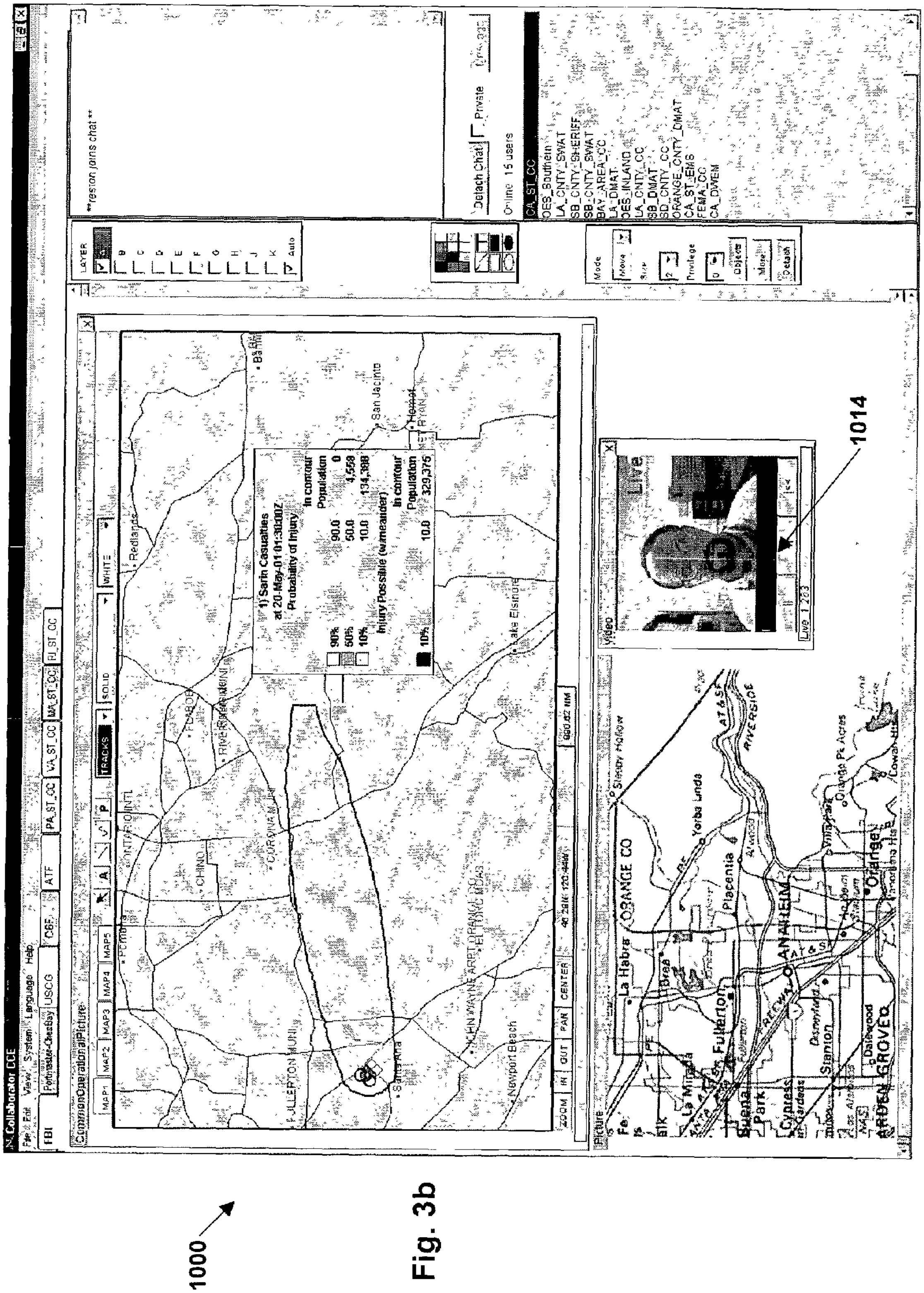
Figure 3C:
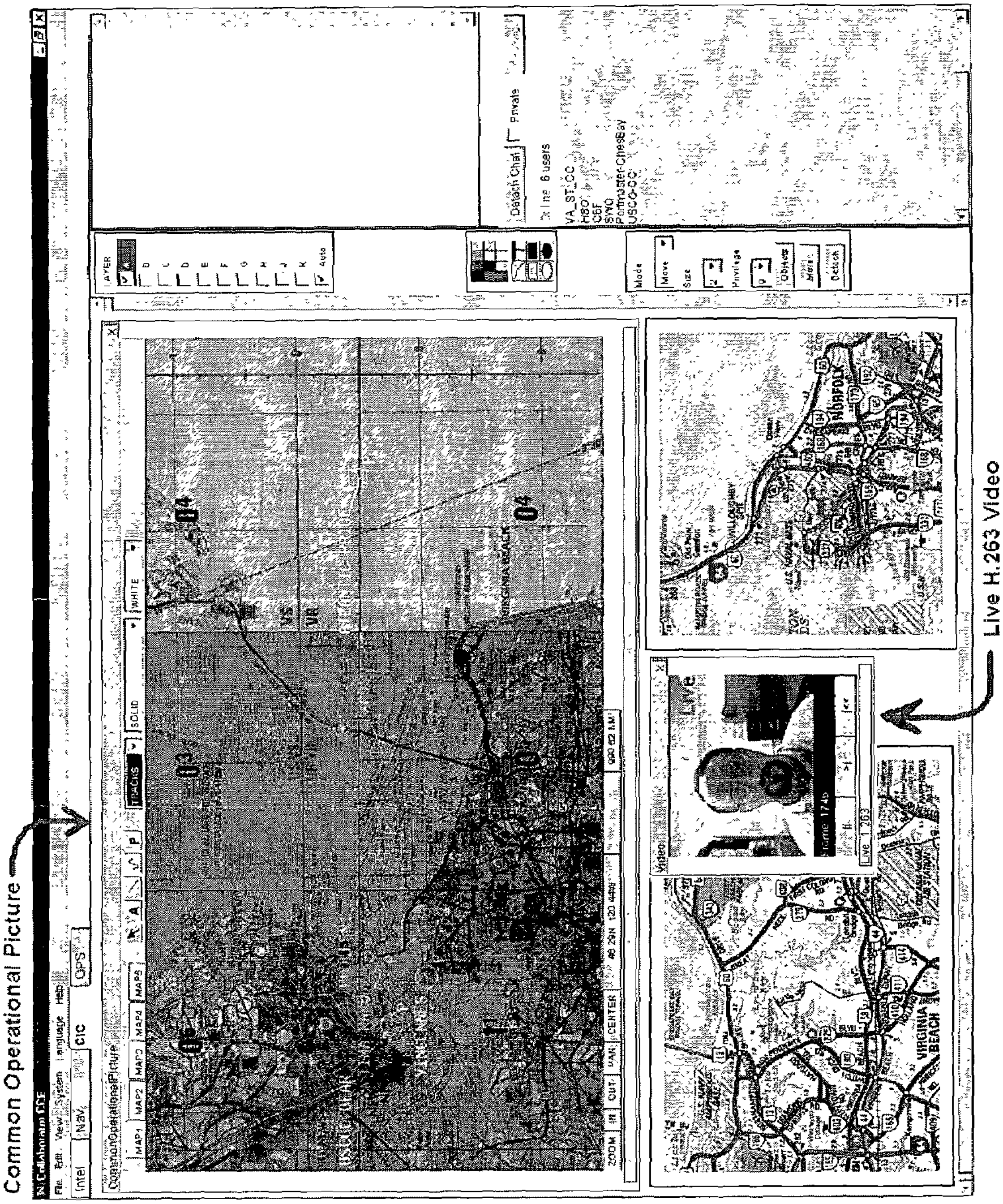
Figure 3D:
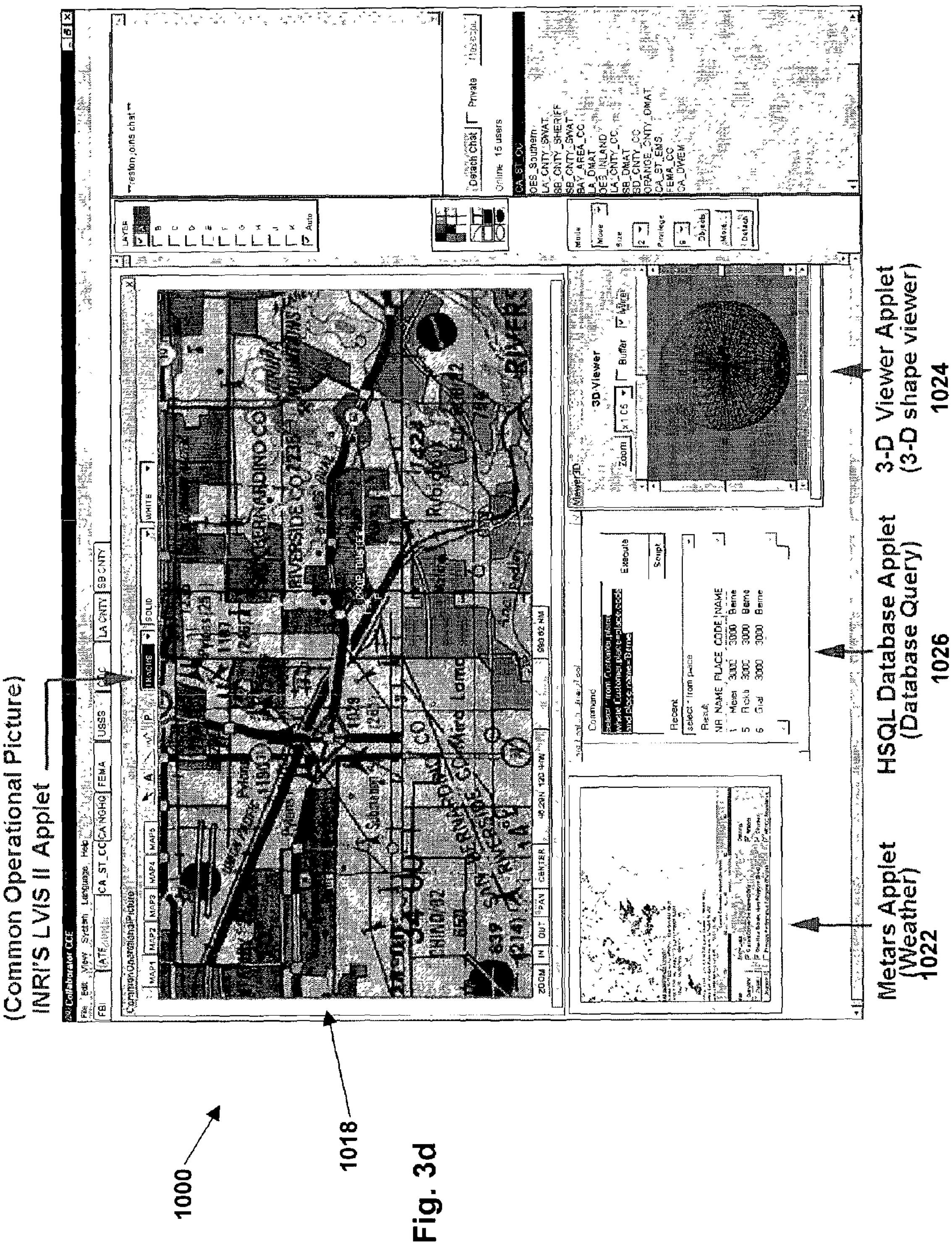

It will also be appreciated that the Collaborator CCE client 301 permits display of images having Active Moving Content via one or more common operational picture (COP) objects 1018, which permits users to view active moving content without loading additional software. COP objects are defined as part of the Global Command and Control System (GCCS), which is a single seamless command and control system, and an integral part of a Department of Defense (DoD) initiative to provide information support to all levels of military command across a Common Operating Environment (COE). The Common Operational Picture (COP) is a concept in which applications, COE Common Support Layer Services, and COE Infrastructure Layer Services function and interact to produce a COP for the warfighter. COP Services, which support the creation and maintenance of a COP, are not represented by a single Common Support Layer Service or Infrastructure Layer Service in the Defense Information Infrastructure (DII) COE. Rather, COP Services represent a specific way of employing core DII COE services. It should be noted that images with active moving content, e.g., continuous track updates, advantageously can be viewed by a user via COP without requiring that the Collaborator CCE client be implemented on a DII-COE compliant machine. It should be mentioned that multiple COP objects 1018 advantageously can be displayed simultaneously on the Whiteboard area 1004, as illustrated in FIGS. 3*a*–3*d*. It should also be mentioned that the METARS Applet1022 illustrated in FIG. 3*d* is not a COP object. The Meteorological Aviation Report (METARS) object, which is a product of the Aviation Digital Data Service, which is funded by the National Oceanic and Atmospheric Administration (NOAA), is viewed by a separate JAVA™ Applet.

It should also be mentioned at this point that the Collaborator CCE client 301 advantageously can display or render any images conforming to the Global Information System (GIS) mapping standard. GIS is an information system that deals with spatial information that links attributes and characteristics of an area to its geographic location. It is used in a variety of applications, including exploration, demographics, dispatching, tracking and map making. Using satellites and aerial photography, the U.S. Geological Survey and other organizations have developed digital maps of most of the world. However, unlike paper maps, digital maps can be combined with layers of information.

Finally, it will be noted from FIG. 3*d* that the Collaborator CCE client 301 advantageously can display 3D objects 1024 instantiated by a 3D object Applet. It will be appreciated that there are several commercial software applications available that are capable of producing a 3D image from at least two images captured from different camera angles, e.g., two pictures from a satellite taken several seconds apart can be processed to produce a 3D image of the terrain. Other source of 3D images such the renderings of VMRL data objects advantageously can be displayed as a 3D object 1024.

Referring now to FIG. 5, the format of a message object employed in an exemplary embodiment of the present invention will now be described. First, it will be noted that each object identifies the Sender, i.e., the originator of the object, and the object's destination, privilege level, assigned Group, assigned User, Data, and Source. The message also includes a Timestamp. It will be appreciated that the message object supports two types of objects, public and private, the latter being generated when two or more users are collaborating in, for example, a private chat room. It will be noted that private chats permit user's to interoperate privately, just as they would in a real meeting room, without disturbing the other users or detracting from their efforts.

It will be appreciated that the objects passed between Whiteboard Clients described in U.S. Pat. No. 6,351,777 were wrapper objects, each of which tells the White Board the kind of object to display, its location, size and other characteristics. This becomes rather cumbersome when new object types are added to accommodate increased Collaborator CCE capabilities. Thus, each exchange between machines in the Collaborator CCE is made utilizing message objects.

It will be noted that operational security advantageously can be enhanced via message object filtering. It will also be noted that since the message object includes several parameters including Group, the message objects arriving at the Collaborator CCE 102 advantageously can be filtered and selectively transmitted to other Collaborator CCE clients 301*b*–301*r* connected thereto. For example, Collaborator CCE client 301*a* instantiates an object 1024 and transmits a corresponding data object to the Collaborator CCE server 102. The object 1024 belongs in the CIC Group and has a level 10 privilege, i.e., the highest privilege level in this exemplary case. The Collaborator CCE server filters the "1024" message object with respect to the two other Collaborator CCE clients 301*b* and 301*c* that are members of the CIC Group. In this exemplary case, the Collaborator CCE client 301*b* has an assigned privilege level of 10 and receives the "1024" message object while the Collaborator CCE client 301*c*, which has an assigned privilege level of 5, does not. It should be noted that the principles of filtering employed in the exemplary embodiments according to the present invention being discussed are discussed in connection with FIG. 11 in U.S. Pat. No. 6,351,777.

It should be mentioned at this point that all of the interchange between the Collaborator CCE clients is via the Collaborator CCE server and that all such communications employ message objects. Thus, the Collaborator CCE server advantageously can record all of the message objects as they are generated. It will be noted that the technique disclosed in U.S. Pat. No. 6,351,777 required that the oldest Whiteboard client update any client joining the Whiteboard session. The technique of recording the message object eliminates the need for one Collaborator CCE client to update the files of another Collaborator CCE client. Moreover, this permits the Collaborator CCE server to replay each collaborative session. It will be appreciated that this also permits users to, for example, break for the night and resume work on a task without recreating the session from scratch.

In any event, since all of the message objects are routed via the Collaborator CCE server 102, all of the message objects, i.e., images, text files, VoIP packets, etc., can all be filtered to ensure that the user has a sufficient privilege level to receive the message object. From the structure of the message object illustrated in FIG. 5, it will be appreciated that each user advantageously may belong to any number of groups and may enjoy a different privilege level for each respective group. Thus, a user may belong to groups 1, 2, and 3 and have privilege levels 1, 5, and 10, respectively, in those groups.

Furthermore, it will be appreciated that the web's Extended Markup Language (XML) paves the way to save user authentication and collaborative data in a way that maintains backward compatibility and portability with other tools. One open standard authentication file can be used to log into multiple applications that have to interoperate with each other.

In short, Collaborator CCE provides the user with a chat room equipped with a synchronized multi-layered, multimedia white board. The Collaborator CCE advantageously provides multiple group privileging schemes to hide and separate data from among the different users, i.e., implements the Bella-Lapadala security algorithm. Effectively, intelligence analysts can post information onto the Whiteboard 1004 for limited distribution to the community of logged in users. Group association of the data can restrict read and write privileges such that privileged warfighters reading the data cannot accidentally alter the information they require. Users may choose to save or retrieve the contents of a white board. Users can also upload and download files from a shared file storage area within Collaborator CCE.

It will be appreciated that Collaborator CCE also provides the capability to collaboratively view, hook and annotate live track objects to facilitate collaborative track evaluation. This is especially useful in establishing enemy patterns of action to help focus own force replanning. Privileged users may share the exact same common operational picture set at the same zoom range, latitude and longitude. Privileged users are able to share the same map view and track annotations. Collaborator CCE can log all the user activity so that a mission can be played back to gain lessons learned.

While the exemplary embodiment discussed above is employed in a military environment, the Collaborator CCE is not so limited. The Collaborator CCE has applications in mission planning, weather forecasting, telemedicine, logistics support and training. Moreover, Collaborator CCE supports the digital multimedia communication of information in a 24/7 secure environment with dispersed personnel across time, geographic and language barriers. Thus, the Collaborator CCE provides the user with reliable, low bandwidth, multi-lingual, multimedia (image, video, voice, and chat, and multi-privileged access whiteboards and chat rooms using only a commercial Internet web browser.

Moreover, as discussed above, the Collaborator CCE works with just a Java-enabled commercial off the shelf (COTS) Internet web browser (i.e. Netscape, Internet Explorer) on computers running Windows, MacOS, Linux and Unix. It is browser and web server independent in that it does not require any specific vendor's products to operate, thus providing interoperability regardless of computer architecture. Since the software is accessed over a network by an Internet web browser on demand, there is no software to distribute and install into the user community prior to usage so logistics support is simplified. Collaborator CCE is open systems architecture based and implements the World Wide Web standards. It is easily scalable without changing Collaborator's core software.

Collaborator CCE is a client-server architecture product. The server is written as a Java application for cross platform portability. The client is also written as a Java applet for cross platform portability and interoperability. Collaborator users do not have to be running on the same style computer or operating system to collaborate with each other.

It should be mentioned that Collaborator CCE is designed to be survivable in hostile computing environments and is resistant to server outages, thus preventing a single point of failure. Collaborator's system administration can be accomplished worldwide through an Internet web browser. A System Administrator can create, edit and delete user groups (also known as Communities of Interest) and individual user accounts. The System Administrator can also eject users from a collaboration session and review all collaboration activity at will.

The Collaborator CCE maintains an audit trail, i.e., all whiteboard content and chat text is time stamped and can be traced directly back to the user. Its design provides activity logging for the play back of virtual meetings to gather lessons learned. Additionally, users can save whiteboard content and chat at will for later retrieval.

When the user logs into Collaborator, the user may change Collaborator's appearance to the native language of the user's respective country. Collaborator is designed to support language translation in near real time. Upon logging in, the user is presented with a folder consisting of one or more tabs, each containing a unique whiteboard, chat room and active user list. Clicking on a folder tab allows the user to join a collaboration session with a different Community of Interest.

In comparison with traditional GroupWare whiteboards, the Collaborator CCE is more like a shared web-based desktop that can be annotated. Not only can the whiteboard hold static images, text and annotations, but the whiteboard can also move them, resize them, delete them. The Whiteboard area 1004 can also instantiate and contain other third party Java applets that can also be shared, moved, resized and deleted. This capability allows users to share maps with active moving content, streaming videos, calendars, documents, presentations and other customer unique modules. Furthermore, the Collaborator CCE's whiteboard is designed to allow Java applets on the whiteboard to communicate with each other to build additional functionality. Thus, not only can users collaborate, but objects on the whiteboard can also collaborate.

Where most collaboration whiteboards provide one plane on which to draw, Collaborator provides ten. Each drawing plane is a transparent layer that simultaneously overlays the others. A map can be placed on Layer A and annotated on Layer B. Separation by layer allows the user to logically group visual information. Each layer can be individually hidden or shown to reduce clutter or provide additional information, respectively.

Where collaborative GroupWare whiteboards typically assume everyone has equal access, Collaborator provides ten levels of privileged access. A user has a unique access privilege within each Community of Interest, i.e., Group, so that only users with a need to know and proper access privilege have the ability to view and listen to information on the whiteboard and the associated chat room.

GroupWare typically restricts the number of users in a virtual meeting. By design, Collaborator does not limit the number of simultaneous users in a virtual meeting.

In short, the Collaborator CCE is implemented as a web browser based program written as a Java applet. When the user visits the web page containing Collaborator CCE, e.g., the HTML page illustrated in FIGS. 4*a* and 4*b*, the Collaborator CCE applet automatically loads. This offers the following advantages:

1. No user software to install.
2. Cross platform interoperability.
3. Cross application domain utility.
4. Reduced distribution costs.
5. Users automatically receive the latest version of the program when visiting the web site.
6. A web browser provides a familiar environment for most users.
7. Any web server can serve the program to the user's web browser.

Collaborator's software design is based upon object oriented programming. Each object placed on the white board conforms to a programming interface. All the objects are mouse event aware so that the user can manipulate them at any time. To simplify the design, there are only three basic types of objects that Collaborator can draw on the white board. All manner of objects extend from these basic three. The three basic object types are:

1. Component
2. Light-weight Component
3. Light-weight Container

Light-weight objects give the object transparency and the ability to take on shapes other than a rectangle. Collaborator's objects such as Freehand and Oval are light-weight components. Collaborator's objects such as FilledOval and FilledRectangle are light-weight containers.

Java's concept of a container allows objects to be logically grouped together. This allows for nested objects which makes it simple to annotate a Picture with an object such as an Oval. The Oval is contained in the Picture object. Therefore, when the Picture is moved, the Oval moves with it. The user does not have to associate the Oval to the Picture because it is done automatically.

Since graphical objects can be made to hide and show independently, Collaborator gives each graphical object one of ten virtual placement layer assignments. If the layer is set to be visible, then the object on that layer shows. This capability allows for a user to blank selected annotations by overlay layer on a picture for an unobstructed view.

Collaborator's component object allows Collaborator to run third party applets directly on the white board. The component object acts like a shell that provides all the necessary Java applet interfaces and makes the necessary method calls that an applet expects. In effect, any applet that can sit on a web page can sit on Collaborator's white board using this component shell.

Applets on the white board may communicate with the white board and with each other to extend collaborative functionalities. For example, one applet might be a Geospatial Information System (GIS) map applet. Another applet may be a database. It is possible for the GIS applet to exchange data with the database applet whenever a particular feature or track overlay is clicked on the map.

One of ordinary skill in the art will appreciate that this open standard for is extending Collaborator's functionality creates an infinite possibility of applications to be run in one common environment using the collaborative white board as the shell or like a GUI.

To make the most of bandwidth utilization, Collaborator does not transfer data unless a user or an object on the white board initiates a data transfer. Clients exchange parameters and commands as opposed to the graphical objects themselves. When data does reach Collaborator, its network library searches for the destination object just as a mailroom clerk would. Each object automatically registers itself with the mailroom when it is created. This mailroom paradigm allows Collaborator to service white board objects quickly thus allowing them to respond to network messages independently as opposed to a monolithic interpreter that executes commands for one object at a time. Effectively, using this paradigm, objects can communicate with each other across the network with little overhead.

To enforce security, each user account and object has a security privilege field. The server compares the security privilege of the data object to that of the user. If the user has sufficient privilege, then the data is sent. If the user lacks privilege, then the data is never transferred to the user's computer system. This feature works well for respecting rank, privilege and coalition treaties.

For fault tolerance, Collaborator's client monitors the connection via Java's socket library. If the server is goes offline, Collaborator is capable of automatically logging the user back in when a server is found.

For mission playback, Collaborator has a central logging function capable of logging chat and white board information chronologically. Activity logs and white board documents advantageously can be saved in Extended Markup Language (XML) for maximized portability.

For users speaking dissimilar languages, Collaborator can present the graphical user interface (GUI) in a language other than English. It is possible to inject a language translator or a set of lookup tables to translate one language to another.

Taking the events of Sep. 11, 2001 into account, organizational counter-terrorism efforts involve working with DoD components, the Federal Aviation Administration (FAA), the U.S. Coast Guard, the Federal Emergency Management Agency (FEMA), first responders, local authorities, and non-government organizations (NGOS) such as the Red Cross. For example, USNS Comfort (T-AH 20) provided a medical relief clinic for disaster-relief workers while U.S. Navy combatants sailed to defend New York City from further potential attacks. Such an undertaking requires rapid coordination while maintaining common situational awareness across a wide user community both in planning Force Protection and in Crisis Management.

When disaster strikes, time is precious. People cannot afford to brief three groups of individuals in three separate meetings simply because each group is cleared for three different levels of information regarding the same subject matter. Collaborator facilitates sharing compartmentalized information. In a crisis, the locations of aid workers, troops, airplanes, ships and ground vehicles are constantly changing with respect to the area being monitored and displayed in a common picture. Collaborator can display a common picture with moving tracks on its white board. The user can select a track by clicking it to view all the known details about that track. All users with a need to know are able to share the same view of the common picture and observe the same track being selected. In other words, filterable layers permit, for example, classified and unclassified track annotations over a single image or map. The Collaborator CCE's video capability allows mission planners and rescue workers to point out features from a reconnaissance camera aboard an Unmanned Aerial Vehicle (UAV) or carried by a rescue worker. Medics can share medical imagery with remote hospitals and facilities. The World Wide Web technology is a great leveler for interoperability so that all the users involved have a means to interoperate regardless of the vendor make and model of their computer just by using their Internet web browsers.

It should be mentioned that exemplary software programs and Applets for instantiating by the Collaborator CCE server and any number of Collaborator CCE clients are provided in the attached CD-ROM Appendix. It will be appreciated that all of the material contained therein, including software or Applet modules and comment text, are incorporated herein by reference for all purposes.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. Machine readable code stored on a tangible computer-readable medium for converting a general purpose computer system including at least first, second, and third computers operatively coupled to one another by a communications channel to instantiate a Collaborator common collaboration environment (CCE) facilitating collaboration between users co-located with the second and third computers, the machine readable code instantiating:

a Collaborator CCE server on the first computer, the Collaborator CCE server providing a web page invoking selected portions of the machine readable code; and first and second Collaborator CCE clients on the second and third computers, respectively, in response to receiving the web page from the Collaborator CCE server, wherein:

each of the first and second Collaborator CCE clients generates first and second message objects, respectively, each message object containing a group identifier and a privilege level; and the Collaborator CCE server receives the first and second message objects, stores the first and second message objects, and transmits the first and second message objects to the second and first Collaborator CCE clients, respectively, when the receiving one of the first and second Collaborator CCE clients belongs to a group corresponding to the group identifier and when the privilege level of the receiving one of the Collaborator CCE clients equals or exceeds the privilege level of the respective one of the first and second message objects, wherein:

one of the first and second Collaborator CCE clients instantiates a Meteorological Aviation Report (METARS) Applet; and at least one of the first and second message objects conforms to the Global Information System (GIS) map standard.

2. The machine readable code as recited in claim 1, wherein:

the communications channel conforms to Internet protocols; and the first and second message objects correspond to first and second audio packets to thereby permit the first and second users to communicate with one another using a voice over Internet Protocol (VoIP) function.

3. The machine readable code as recited in claim 1, wherein the Collaborator CCE server accumulates the first and second message objects to thereby permit the accumulated first and second message objects to be replayed under user control.

4. The machine readable code as recited in claim 1, wherein at least one of the first and second Collaborator CCE clients instantiates fist and second Applets capable of communicating with one another.

5. The machine readable code as recited in claim 1, wherein:

the computer system further comprises a fourth computer instantiating an object server generating a servable object, and one of the first and second Collaborator CCE clients instantiates an object Applet using the machine readable code, for receiving the servable object via the communications channel.

6. The machine readable code as recited in claim 1, wherein:

the computer system further comprises a fourth computer instantiating an object server generating a servable object; and one of the first and second Collaborator CCE clients instantiates an object Applet using the machine readable code, for receiving the servable object from the proxy server via the communications channel.

7. The machine readable code as recited in claim 1, wherein the first and second message objects correspond to live video packets.

8. The machine readable code as recited in claim 1, wherein at least one of the first and second message objects conforms to the Global Information System (GIS) map standard.

9. The machine readable code as recited in claim 1, wherein one of the first and second Collaborator CCE clients instantiates a Common Object Request Broker Architecture (CORBA)-enabled Applet using the machine readable code.

* * * * *